Patented Apr. 22, 1952

2,593,451

UNITED STATES PATENT OFFICE 2,593,451

DEHYDROCHLORINATION OF POLYCHLOROETHANES

Howard W. Hill, Concord, and Eldred L. Dance, Pittsburg, Calif., assignors to The Dow Chemical Company, Midland, Mich., a corporation of Delaware No Drawing. Application June 25, 1947, Serial No. 757,062

3 Claims. (Cl. 260—654)

This invention relates to the preparation of unsaturated chloroethanes by the dehydrochlorination of corresponding saturated polychloroethanes having 3 chlorine atoms attached to a single carbon atom in the molecule, by a method in which the reaction is carried out in liquid phase under anhydrous conditions.

The preparation of tetrachloroethylene by the liquid phase dehydrochlorination of pentachloroethane in the presence of aluminum chloride as catalyst has been disclosed in Patent No. 2,249,512. We have found that 1,1,1-trichloroethane and 1,1,1,2-tetrachloroethane can be similarly reacted in the presence of aluminum chloride, forming vinylidine chloride (1,1-dichloroethylene) and trichloroethylene, respectively, but the operation is accompanied by the formation of considerable amounts of high boiling polymers or tars. Consequently, such treatment, in the case of the last-mentioned compounds, is not well adapted for commercial use, since it involves too great a loss of material.

We have further found, however, that the above-mentioned difficulty is substantially avoided when anhydrous ferric chloride is employed as catalyst for the reaction. By the use of the latter catalyst the liquid phase dehydrochlorination of 1,1,1-trichloroethane and of 1,1,1,2-tetrachloroethane occurs smoothly in high yield with little or no formation of tar. A similar procedure does not cause splitting off of hydrogen chloride to any material extent from the isomeric compounds 1,1,2-trichloroethane and 1,1,2,2-tetrachloroethane. Thus it is possible to separate the respective isomers from each other by means of the method of the invention.

In carrying out the invention the liquid compound to be dehydrochlorinated with addition of a catalytic amount of anhydrous ferric chloride, is placed in a still provided with a fractionating column and condenser. When the still contents are heated, the reaction commences after a moderate rise of temperature and proceeds rapidly with evolution of hydrogen chloride at a temperature such that the dehydrochlorinated product distills off as it is formed. The vapors are fractionated to reflux higher boiling materials, while hydrogen chloride and vapors of the dehydrochlorinated product pass overhead to a condenser, where the latter are liquefied and separated from gaseous hydrogen chloride. For decomposing 1,1,1-trichloroethane a suitable reaction temperature is between about 50° and 74° C. at approximately atmospheric pressure, while for 1,1,1,2-tetrachloroethane the range is from about 100° to 130° C. at atmospheric pressure. The reaction may be carried out at somewhat higher temperatures under superatmospheric pressure, not exceeding the boiling point of the starting material at the pressure employed, but there is no practical advantage in operating at pressures materially higher than atmospheric.

The method may be carried out continuously by feeding the saturated polychloride together with the catalyst into the reaction vessel during the reaction at a rate such as to maintain a liquid level therein.

The proportion of anhydrous ferric chloride added as catalyst for the dehydrochlorination is very small, on the order of 0.05 to 1.0 per cent by weight or less. Ferric chloride is very slightly soluble in 1,1,1-trichloroethane and 1,1,1,2-tetrachloroethane, less than 0.05 per cent. It appears that only the dissolved portion of the catalyst is effective for dehydrochlorination, since the compounds when saturated with ferric chloride are decomposed as readily in the absence of undissolved particles of the catalyst as when the latter are present. In case the catalyst should lose activity during the reaction, additional amounts thereof may be added to restore the desired rate of reaction. If the reaction vessel is of iron or steel, a similar result is attained by addition of a corresponding amount of chlorine which reacts with the exposed iron surfaces of the vessel to form an active ferric chloride catalyst. It is important to exclude moisture, alcohols or traces of lubricating oil from the material fed to the reactor, because such impurities cause rapid deactivation of the catalyst.

Example 1

One-half gram of anhydrous $FeCl_3$ was added to 600 cc. (795 grams) of 1,1,1-trichloroethane, and the latter was shaken until a portion of the catalyst dissolved. The liquid was poured off the sediment of undissolved $FeCl_3$ into a 1000 cc. distillation flask provided with a feed tube and a fractionation column, the latter being connected to a refrigerated condenser. The contents of the flask were heated to active ebullition at a rate to maintain the head temperature of the column at the boiling point of vinylidene chloride (31.7° C.), the vapors of the latter being condensed and separated from the evolved hydrogen chloride. Distillation was continued at an average rate of about 100 cc. per hour, while adding additional 1,1,1-trichloroethane saturated with $FeCl_3$ through the feed tube to maintain the liquid level in the flask, until a total of 2045 cc.

(20.3 gram mols) had been added. At the end the contents of the flask were evaporated to dryness. The distillate contained 17.9 gram mols of vinylidene chloride and 1.1 gram mols of 1,1,1-trichloroethane. The yield of vinylidene chloride was 93 per cent.

*Example 2*

Into a flask provided with a fractionating column and condenser was charged a mixture of 301 grams (1.795 mols) 1,1,2,2-$C_2H_2Cl_4$, 328 grams (1.954 mols) 1,1,1,2-$C_2H_2Cl_4$, and 6.3 grams $FeCl_3$. The mixture was heated to boiling at a rate such that the head temperature of the column was maintained at 87° C., i. e. the boiling point of $C_2HCl_3$. The overhead vapors were condensed and collected as liquid. After 40 minutes' heating, distillation ceased at the head temperature of 87° C., whereupon the temperature was increased in order to distill the remaining contents of the flask. The distillate consisted of 265.6 grams (2.02 mols) of $C_2HCl_3$ and 262 grams (1.56 mols) of 1,1,2,2-$C_2H_2Cl_4$.

The method of the invention may be employed to separate 1,1,1-trichloroethane or 1,1,1,2-tetrachloroethane from mixtures thereof with other chlorinated derivatives of ethane, or of methane or ethylene, which are not decomposed by action of ferric chloride under the reaction conditions. Examples of such other chlorinated derivatives are ethylene chloride, carbon tetrachloride, tetrachloroethylene, etc.

We claim:

1. A method of dehydrochlorinating a polychlorinated ethane compound of the class consisting of 1,1,1-trichloroethane and 1,1,2-tetrachloroethane, which comprises heating the compound in liquid phase in the presence of a catalytic amount of anhydrous ferric chloride at a temperature sufficient to vaporize the dehydrochlorinated compound as it is formed.

2. A method of making vinylidene chloride, which comprises heating liquid 1,1,1-trichloroethane in the presence of a catalytic amount of anhydrous ferric chloride at a temperature sufficient to distill vinylidene chloride from the liquid as it is formed.

3. A method of making trichloroethylene, which comprises heating liquid 1,1,1,2-tetrachloroethane in the presence of a catalytic amount of anhydrous ferric chloride at a temperature sufficient to distill trichloroethylene from the liquid as it is formed.

HOWARD W. HILL.
ELDRED L. DANCE.

REFERENCES CITED

The following references are of record in the file of this patent:

UNITED STATES PATENTS

| Number | Name | Date |
| --- | --- | --- |
| 1,198,944 | Matthews et al. | Sept. 19, 1916 |
| 1,419,969 | Kaufler | June 20, 1922 |
| 2,084,937 | Britton et al. | June 22, 1937 |
| 2,134,102 | Cass | Oct. 25, 1938 |
| 2,467,123 | Fleck et al. | Apr. 12, 1949 |

FOREIGN PATENTS

| Number | Country | Date |
| --- | --- | --- |
| 436,133 | Great Britain | Oct. 4, 1935 |